(12) United States Patent
Ichimura

(10) Patent No.: US 11,977,164 B2
(45) Date of Patent: May 7, 2024

(54) OBSTACLE SENSING SYSTEM AND OBSTACLE SENSING METHOD

(71) Applicant: MITSUI E&S MACHINERY CO., LTD., Tokyo (JP)

(72) Inventor: Kinya Ichimura, Tokyo (JP)

(73) Assignee: Mitsul E&S Co., Ltd., Tokyo (JP)

( * ) Notice: Subject to any disclaimer, the term of this patent is extended or adjusted under 35 U.S.C. 154(b) by 904 days.

(21) Appl. No.: 16/981,461

(22) PCT Filed: Mar. 16, 2018

(86) PCT No.: PCT/JP2018/010634
§ 371 (c)(1),
(2) Date: Sep. 16, 2020

(87) PCT Pub. No.: WO2019/176116
PCT Pub. Date: Sep. 19, 2019

(65) Prior Publication Data
US 2021/0072399 A1 Mar. 11, 2021

(51) Int. Cl.
G01S 17/00 (2020.01)
B60W 30/095 (2012.01)
G01S 7/48 (2006.01)
G01S 7/481 (2006.01)
G01S 7/484 (2006.01)
G01S 17/931 (2020.01)
G05D 1/00 (2006.01)

(52) U.S. Cl.
CPC ....... *G01S 17/931* (2020.01); *B60W 30/0956* (2013.01); *G01S 7/4802* (2013.01); *G01S 7/4817* (2013.01); *G01S 7/484* (2013.01); *G05D 1/024* (2013.01)

(58) Field of Classification Search
USPC ............................................... 356/4.01, 5.01
See application file for complete search history.

(56) References Cited

U.S. PATENT DOCUMENTS 5,612,781 A * 3/1997 Ohtomo ............... G01C 15/002
356/152.3
5,970,433 A 10/1999 Oka et al.
(Continued)

FOREIGN PATENT DOCUMENTS

EP 2 058 678 A2 5/2009
JP H06-187036 A 7/1994
(Continued)

*Primary Examiner* — James R Hulka
(74) *Attorney, Agent, or Firm* — Carrier, Shende & Associates P.C.; Joseph P. Carrier; Jeffrey T. Gedeon

(57) ABSTRACT

Provided are an obstacle sensing system and an obstacle sensing method whereby precision when determining the presence/absence of an obstacle can be enhanced. In sensing of an obstacle by a configuration in which laser light is radiated from a transmission part 9 mounted to a moving body while the irradiation angle θn is varied, and reflected light of the laser light is received by a reception part 10, a sensing region S is set in advance in a region on the periphery of a reflection position Pn from which the laser light is reflected when there is no obstacle, and a determination mechanism 13 determines whether an obstacle is present or absent in accordance with the reflected light reflected inside the sensing region S.

12 Claims, 6 Drawing Sheets

(56) References Cited

U.S. PATENT DOCUMENTS

| | | | |
|---|---|---|---|
| 8,724,094 B2* | 5/2014 | Miyahara | G01S 17/931 |
| | | | 356/9 |
| 9,411,338 B2 | 8/2016 | Hanaoka et al. | |
| 10,502,832 B2* | 12/2019 | Tehrani Niknejad | G01S 17/42 |
| 10,514,702 B2* | 12/2019 | Chung | G01S 17/931 |
| 2005/0093735 A1* | 5/2005 | Samukawa | B60T 7/22 |
| | | | 340/436 |
| 2007/0276599 A1* | 11/2007 | Ogawa | G01S 17/931 |
| | | | 701/1 |
| 2010/0066587 A1* | 3/2010 | Yamauchi | G05D 1/0044 |
| | | | 342/54 |
| 2011/0248880 A1 | 10/2011 | Miyahara et al. | |
| 2015/0362921 A1* | 12/2015 | Hanaoka | G05D 1/0088 |
| | | | 702/159 |
| 2017/0060132 A1 | 3/2017 | Chung et al. | |

FOREIGN PATENT DOCUMENTS

| | | |
|---|---|---|
| JP | 2000-075032 A | 3/2000 |
| JP | 2007-193495 A | 8/2007 |
| JP | 2009-288097 A | 12/2009 |
| JP | 2010-102485 A | 5/2010 |
| JP | 2014-194729 A | 10/2014 |
| JP | 2014-202527 A | 10/2014 |
| JP | 2016-224854 A | 12/2016 |
| JP | 2017-083223 A | 5/2017 |
| JP | 2017-130098 A | 7/2017 |

* cited by examiner

OBSTACLE SENSING SYSTEM AND OBSTACLE SENSING METHOD

TECHNICAL FIELD

The present invention relates to an obstacle sensing system that is installed in a moving body such as, for example, a vehicle configured to travel on a travel surface and that senses whether an obstacle is present or absent around the moving body and to an obstacle sensing method, and in detail relates to an obstacle sensing system and an obstacle sensing method that can improve accuracy in determination of presence or absence of an obstacle.

BACKGROUND ART

Various obstacle sensing systems that are installed in automatic driving vehicles and that sense obstacles around the vehicles are proposed (for example, see Patent Document 1).

The obstacle sensing system described in Patent Document 1 includes a two-dimensional laser scanner that performs scanning by steering a laser light beam to front of the vehicle in a horizontal direction. This system determines whether an obstacle is present or absent by sensing a reflected light beam obtained when the emitted laser light beam is reflected on the obstacle. Specifically, the system determines that an obstacle is present when the reflected light beam is obtained and determines that an obstacle is absent when no reflected light beam is obtained.

The system described in Patent Document 1 is configured to determine that an obstacle is absent and traveling is safe when no reflected light beam is obtained. Accordingly, when an obstacle is an object that is less likely to reflect the laser light beam such as clothes of a worker or the like, the system cannot sense the obstacle. The system has such a defect that it erroneously determines that an obstacle is absent and the traveling is safe even though a worker is present in front of the vehicle. Moreover, the system has such a defect that it determines that an obstacle is absent and the traveling is safe when the reflected light beam cannot be sensed due to a failure of a transmission part configured to emit the laser light beam or a reception part configured to receive the reflected light beam.

Moreover, the system described in Patent Document 1 is configured to determine that an obstacle is present when the reflected light beam is obtained. When this system is used outdoors, the laser light beam is sometimes reflected on, for example, rain, insects, and the like. The system has such a defect that, in this case, it erroneously recognizes that an obstacle is present based on the obtained reflected light beam. Although rain, insects, and the like do not hinder traveling of the vehicle, the system determines that an obstacle is present, and decelerates or stops the vehicle.

The system described in Patent Document 1 has such defects that it determines that an obstacle is absent even though an obstacle is present and determines that an obstacle is present even though an obstacle hindering the traveling of the vehicle is absent. In other words, accuracy in determination of presence or absence of an obstacle is insufficient.

PRIOR ART DOCUMENT

Patent Document

Patent Document 1: Japanese patent application Kokai publication No. Hei 06-187036

SUMMARY OF THE INVENTION

Problem to be Solved by the Invention

The present invention has been made in view of the aforementioned problems and an object thereof is to provide an obstacle sensing system and an obstacle sensing method that can improve accuracy in determination of presence or absence of an obstacle.

Means for Solving the Problem

An obstacle sensing system of the present invention for achieving the aforementioned object is an obstacle sensing system including a transmission part that is installed in a moving body and that emits laser light beams while changing an emission angle and a reception part that receives reflected light beams of the laser light beams, characterized in that the obstacle sensing system comprises: a sensing region setting mechanism that sets a sensing region in advance in a region around reflection positions where the laser light beams are reflected when an obstacle is absent; and a determination mechanism that determines whether an obstacle is present or absent depending on the reflected light beams reflected inside the sensing region.

An obstacle sensing method of the present invention is an obstacle sensing method including emitting laser light beams from a transmission part installed in a moving body while changing an emission angle and receiving reflected light beams of the laser light beams with a reception part to sense presence or absence of an obstacle, characterized in that the obstacle sensing method comprises: setting a sensing region in advance in a region around reflection positions where the laser light beams are reflected when an obstacle is absent; and causing a determination mechanism to determine whether an obstacle is present or absent depending on the reflected light beams reflected inside the sensing region.

Effects of the Invention

The obstacle sensing system and the obstacle sensing method of the present invention are configured to determine whether an obstacle is present or absent based on the reflected light beams from the inside of the sensing region. Since no reflected light beams from the sensing region can be obtained when an obstacle is present, it is possible to sense an obstacle even if the obstacle is an object less likely to reflect the laser light beams. This is advantageous in improving accuracy in the determination of presence or absence of an obstacle.

Moreover, according to the obstacle sensing system and the like of the present invention, when the reflected light beams cannot be sensed due to problems such as a failure of the transmission part that emits the laser light beams or the light reception part that receives the reflected light beams, the reflected light beams from the sensing region cannot be obtained and an obstacle is thus determined to present. Since safe-side measures can be taken, this is advantageous in improving safety.

MODES FOR CARRYING OUT THE INVENTION

Figure 1:
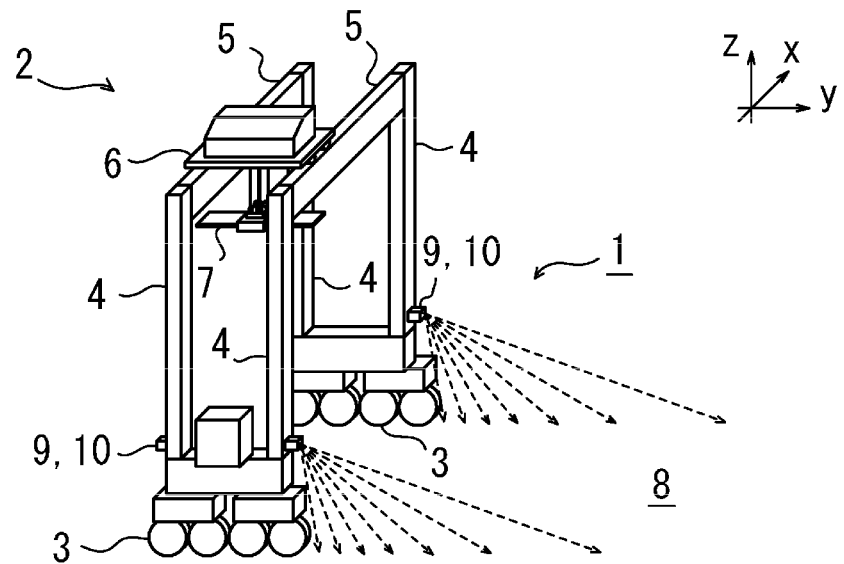
FIG. 1 is an explanatory perspective view illustrating a gantry crane in which an obstacle sensing system of the present invention is installed.

An obstacle sensing system and an obstacle sensing method of the present invention are described below based on embodiments illustrated in the drawings. Note that, in the drawings, a moving direction of a moving body is illustrated by an arrow y, a transverse direction perpendicularly crossing the moving direction y is illustrated by an arrow x, and an up-down direction is illustrated by an arrow z.

As illustrated in FIG. 1, a gantry crane that is a moving body 2 in which the obstacle sensing system of the present invention is installed includes a traveling device 3 that travels in the moving direction y, four leg members 4 that are arranged on the traveling device 3 and that extend in the up-down direction z, two beam members 5 that extend in the transverse direction x and that connecting upper ends of the leg members 4 facing one another in the transverse direction x, a trolley 6 that is movable in the transverse direction x along the beam members 5, and a hoisting tool 7 that is suspended from the trolley 6 by wire ropes. The gantry crane forming the moving body 2 can load and unload containers while traveling on a travel surface 8 in the moving direction y.

The obstacle sensing system 1 includes transmission parts 9 that emit laser light beams toward the travel surface 8 and reception parts 10 that receive reflected light beams reflected on the travel surface 8. The reception parts 10 are arranged near the respective transmission parts 9. In the embodiment, the transmission parts 9 and the reception parts 10 (hereinafter, collectively referred to as transmission parts 9 and the like in some cases) are installed at positions in lower portions of the four leg members 4, near the traveling device 3. The positions where the transmission parts 9 and the like are provided are not limited to the aforementioned positions and may be installed at other positions such as in the traveling device 3.

Each transmission part 9 has a configuration of steering laser beams along the moving direction y in which the gantry crane being the moving body 2 travels, to scan a region in front of the gantry crane in the moving direction thereof that extends from the near side to the far side. In FIG. 1, directions in which the laser light beams are emitted are illustrated by broken lines for description.

The configuration may be such that the transmission parts 9 installed on the rear side of the gantry crane in the moving direction y emit no laser light beams in this case.

The moving body 2 in which the obstacle sensing system 1 is installed is not limited to the gantry crane. The obstacle sensing system 1 can be installed in a moving body 2 that moves on a plane or in a space and can be installed in, for example, a quay crane or a container chassis. Moreover, the obstacle sensing system 1 may be installed in the hoisting tool 7 or the trolley 6 of the gantry crane or the quay crane.

Figure 2:
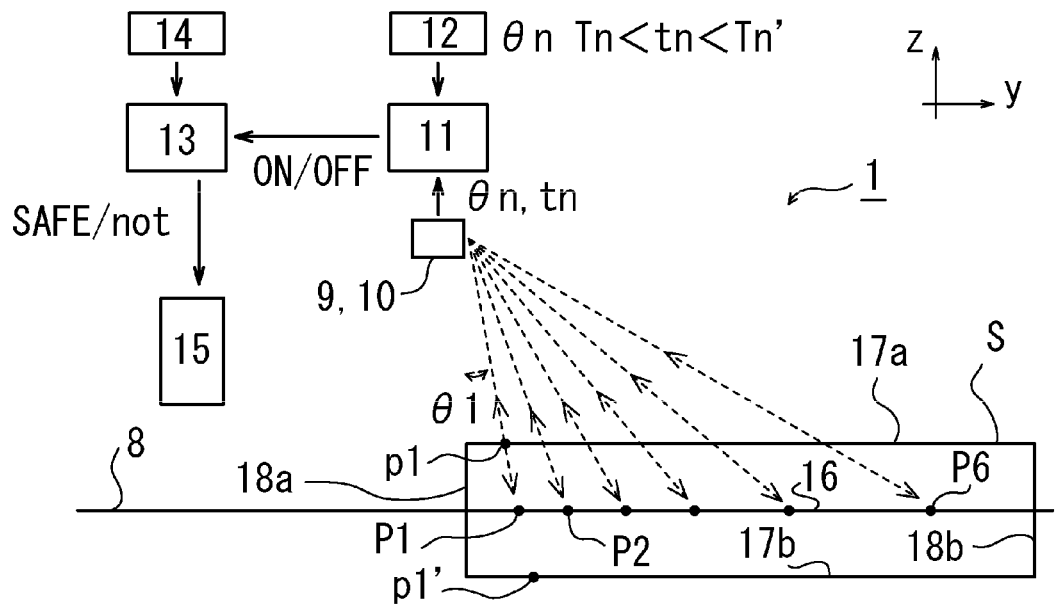
FIG. 2 is an explanatory view illustrating a configuration of the obstacle sensing system of the present invention.

As illustrated in FIG. 2, the obstacle sensing system 1 includes the transmission parts 9 and the reception parts 10. The transmission parts 9 are not limited to the configuration that emits laser light beams. The transmission parts 9 may have a configuration that emits electromagnetic waves such as light and radio waves or a configuration that emits acoustic waves. The reception parts 10 only need to have a configuration that can receive reflection waves such as electromagnetic waves emitted from the transmission parts 9.

The obstacle sensing system 1 includes a comparison mechanism 11 that obtains data from the reception parts 10, a sensing region setting mechanism 12 that sends data to the comparison mechanism 11, a determination mechanism 13 that determines whether an obstacle is present or absent by obtaining data from the comparison mechanism 11, a threshold setting mechanism 14 that is used to adjust a threshold used in the determination mechanism 13, and a control mechanism 15 that controls the moving body 2 based on a determination result in the determination mechanism 13. Note that the comparison mechanism 11, the threshold setting mechanism 14, and the control mechanism 15 are not essential elements of the present invention.

The obstacle sensing system 1 first emits laser light beams from each transmission part 9 toward the travel surface 8. The transmission part 9 emits laser light beams radially (in a fan shape) multiple times in sequence by using rotation of a mirror or the like. The corresponding reception part 10 obtains time to from the emission of each laser light beam to reception of a reflected light beam by the reception part 10, for each angle θn of the emission of the laser light beam from the transmission part 9. In this case, the angle θn indicates a tilt of the laser light beam in a traveling direction thereof with respect to the up-down direction z.

The transmission part 9 and the reception part 10 measure the distance from the transmission part 9 and the like to the travel surface 8. The transmission part 9 and the reception part 10 can be formed of, for example, a two-dimensional laser scanner. For example, a two-dimensional laser scanner that has a resolution of 0.125 to 1.000 degrees for the angle θn and that has a mirror rotation speed of 5 to 100 Hz can be used.

The reception part 10 can use data of a range in which the angle θn is 0 degree or more and 90 degrees or less does not include 90 degrees. The reception part 10 desirably uses data of a range in which the angle θn is 0 degrees or more and 60 degrees or less. The greater the range of the angle θn is, the greater the distance from the moving body 2 to a sensible object is. Accordingly, when the speed of the moving body 2 is high, the upper limit of the range of the angle θn is desirably set close to 90 degrees.

For example, assume a two-dimensional laser scanner in which the range of the angle θn is set to 0 to 60 degrees, the resolution is set to 0.125 degrees, and the rotation speed is set to 5 Hz. In this scanner, the reception part 10 obtains 2400 pieces of measurement data in one second. Specifically, the reception part 10 obtains 2400 pieces of data that are each a combination of the angle θn and the time tn, in one second.

Reflection positions Pn where the laser light beams are reflected on the travel surface 8 are linearly arranged along the scanning direction of the laser light beams. This straight line is sometimes referred to as a reference line 16 hereinafter. The reference line 16 is a virtual straight line formed on the travel surface 8. The reference line 16 can be also referred to as a collection of multiple reflection positions Pn formed by reflection of the laser light beams on the travel surface 8. Since the reference line 16 is formed in a range in which the laser light beams are reflected on the travel surface 8, the position of the reference line 16 relative to the transmission part 9 is fixed. Accordingly, the reference line 16 moves in the moving direction y with movement of the moving body 2 such as the gantry crane. In the embodiment, since the laser light beams are steered along the moving direction y, the reference line 16 is a straight line parallel to the moving direction y. Moreover, the reference line 16 is a straight line extending along the travel surface 8.

In the sensing region setting mechanism 12, a sensing region S is set in advance. The sensing region S is a quadrilateral region formed in a plane extending in the moving direction y and the up-down direction z and is set as a position relative to the transmission part 9 and the like. In this embodiment, the sensing region S is a rectangular region surrounded by paired long sides 17a, 17b set above and below the reflection positions Pn, that is the reference line 16 to extend in a direction along the moving direction y of the moving body 2 and paired short sides 18a, 18b extending in the up-down direction z and connecting end portions of the paired long sides 17a, 17b facing one another. The shape of the sensing region S is not limited to that described above and can be set as appropriate. For example, the shape of the sensing region S may be set to a polygonal shape or a shape including a curve.

In the embodiment, the length of the short sides 18a, 18b of the sensing region S can be set in a range of, for example, plus and minus 100 mm from the reference line 16 in the up-down direction z. In a gantry crane that includes rubber tires, the rubber tires sometimes expand and contract in the up-down direction z due to load of a container. The transmission part 9 and the like move in the up-down direction z with the expansion and contraction of the rubber tires and the sensing region S also moves in the up-down direction z with this movement. The length of the short sides 18a, 18b is set within such a range that the reference line 16 is in the sensing region S even if the sensing region S moves in the up-down direction z.

The length of the long sides 17a, 17b can be set within a range from several meters to several tens of meters in the horizontal direction. The length of the long sides 17a, 17b is set to be longer or the same as the reference line 16. In other words, the range of the sensing region S is set such that the reference line 16 is always in the sensing region S.

The position of the sensing region S relative to the transmission part 9 is fixed. Accordingly, the sensing region S moves in the moving direction y with the movement of the moving body 2 such as the gantry crane like the reference line 16. In this embodiment, since the reference line 16 is parallel to the moving direction y, the sensing region S is a plane parallel to the moving direction y.

The comparison mechanism 11 has a configuration that compares the reflection position Pn of each laser light beam emitted from the transmission part 9 with the sensing region S and determines whether the reflection position Pn is inside or outside the sensing region S. For example, for emission of the laser light beam at an angle θ1, two intersections p1, p1' of an emitting direction of this laser light beam with the border lines of the region S can be determined in advance. In other words, a range of two intersections pn, pn' with the sensing region S is determined for each angle θn.

Specifically, the intersections pn, pn' are set by combining the emission angle θn of the laser light beam and times Tn, Tn' from the emission of the laser light beam from the transmission part 9 to the reception of the reflected light beam by the reception part 10.

When the distance from the reception part 10 to the reflection position P1 is between the distance from the reception part 10 to the intersection p1 and the distance from the reception part 10 to the intersection p1', the comparison mechanism 11 determines that the reflection position P1 is inside the sensing region S. The comparison mechanism 11 determines whether each of the multiple reflection positions Pn is inside or outside the sensing region S based on the data on the sensing region S from the sensing region setting mechanism 12.

Specifically, when the time to from the emission of the laser light beam to the reception of the reflected light beam is between the time Tn corresponding to the intersection pn and the time Tn' corresponding to the intersection pn', the comparison mechanism 11 determines that the received light beam is the reflected light beam from the inside of the sensing region S.

The comparison mechanism 11 sends an ON signal to the determination mechanism 13 when the reflection position Pn is located inside the sensing region S and sends an OFF signal to the determination mechanism 13 when the reflection position Pn is located outside the sensing region S. Signals sent by the comparison mechanism 11 are not limited to the aforementioned signals. The comparison mechanism 11 may be configured to send the OFF signal to the determination mechanism 13 when the reflection position Pn is inside the sensing region S and send the ON signal to the determination mechanism 13 when the reflection position Pn is outside the sensing region S.

The determination mechanism 13 determines whether an obstacle is present or absent depending on a ratio of the ON signals and the OFF signals sent from the comparison mechanism 11. For example, when the reception part 10 receives 2400 pieces of measurement data in one second, 2400 ON and OFF signals are sent from the comparison mechanism 11 to the determination mechanism 13 in one second.

The determination mechanism 13 calculates a ratio of the number of ON signals to a total number of the ON signals and the OFF signals sent from the comparison mechanism 11 per unit time as a fullness percentage. Moreover, the determination mechanism 13 stores a threshold of the fullness percentage determined in advance. The threshold of the fullness percentage can be set to, for example, 90%.

When an obstacle is absent, the reflection positions Pn are located along the reference line 16 and are located inside the sensing region S. Accordingly, 2400 ON signals are sent to the determination mechanism 13 in one second. In this case, the fullness percentage is 100% and is a value equal to or greater than 90% that is the threshold.

Since all laser light beams emitted from the transmission part 9 are reflected on the travel surface 8, it can be found that no obstacle blocking the laser light beams is present between the transmission part 9 and the travel surface 8. The determination mechanism 13 determines that an obstacle is absent and the traveling is safe when the fullness percentage is equal to or higher than the threshold. The determination mechanism 13 is not limited to a configuration that performs determination every second. Frequency of the determination can be set as appropriate and the determination may be performed, for example, every 0.2 seconds.

Figure 3:
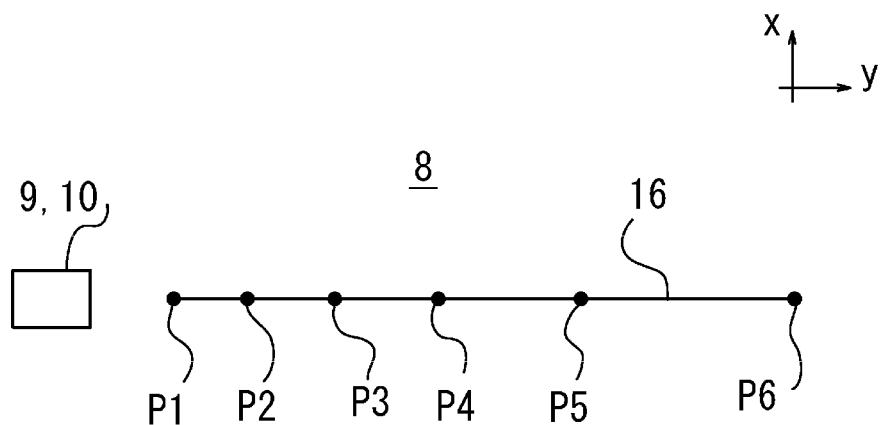
FIG. 3 is an explanatory plan view illustrating a reflection positions on a travel surface when an obstacle is absent.

In this case, as illustrated in FIG. 3, the obstacle sensing system 1 is in a state where it can recognize the entire reference line 16. It can be also said that the obstacle sensing system 1 is in a state where it can see the travel surface 8.

Figure 4:
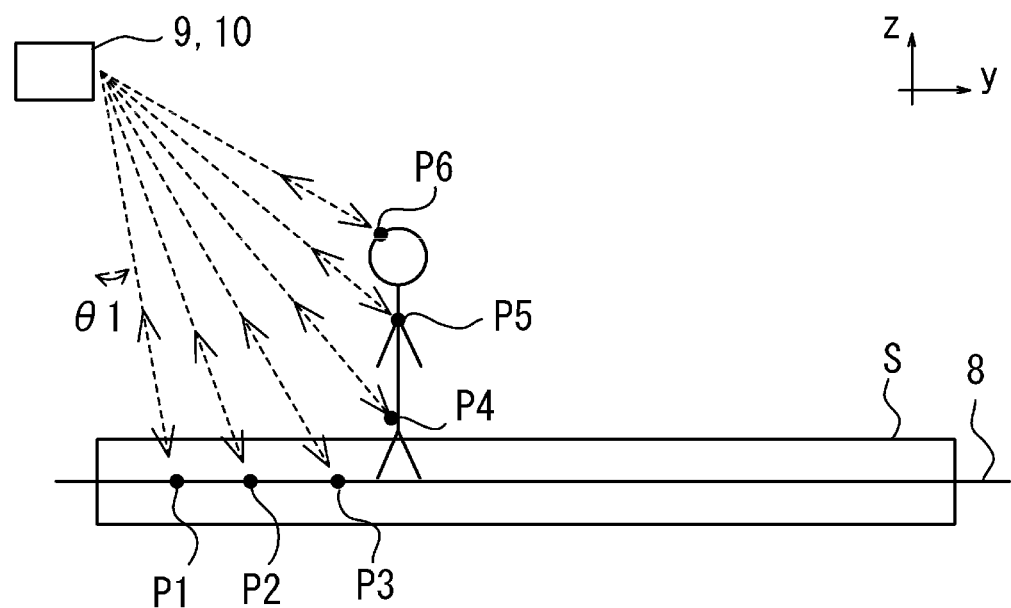
FIG. 4 is an explanatory view illustrating a state in which the obstacle sensing system of FIG. 2 senses an obstacle.
Figure 5:
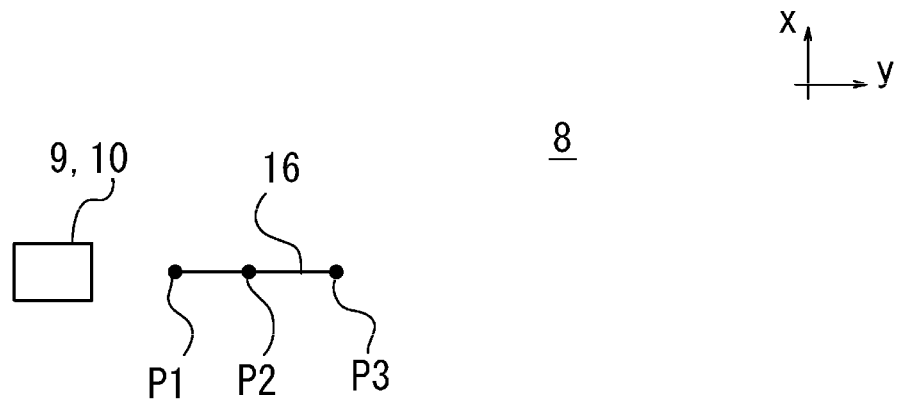
FIG. 5 is an explanatory plan view illustrating the reflection positions on the travel surface when an obstacle is present.

When a worker is in front of the moving body 2 as illustrated in FIGS. 4 and 5, some of the laser light beams emitted from the transmission part 9 are blocked by the worker and do not reach the travel surface 8. When the laser light beams are absorbed by the worker, the obstacle sensing system 1 cannot obtain the reflected light beams. Even if the laser light beams are reflected on the worker, these beams are reflected light beams from the outside of the sensing region S. In both cases, the number of reflected light beams obtained from the inside of the sensing region S decreases when the worker is present. When the reflection position Pn of the reflected light beam is outside the sensing region S, the OFF signal is outputted from the comparison mechanism 11 to the determination mechanism 13.

Specifically, since the reflection positions P1 to P3 are inside the sensing region S, for example, three ON signals are outputted to the determination mechanism 13. Meanwhile, since the reflection positions P4 to P6 are outside the sensing region S, for example, three OFF signals are outputted to the determination mechanism 13.

As illustrated in FIG. 5, the obstacle sensing system 1 is in a state where it can recognize about only half of the reference line 16. The fullness percentage is about 50% and is a value smaller than the threshold. In this case, the obstacle sensing system 1 determines that an obstacle is present on the reference line 16.

When the obstacle sensing system 1 includes the control mechanism 15, the control mechanism 15 may be configured to perform control of stopping the moving body 2 such as the gantry crane or reducing the traveling speed thereof based on the determination made by the determination mechanism 13 that the obstacle is present.

Since the obstacle sensing system 1 is not configured to directly sense an obstacle, the obstacle sensing system 1 can determine that an obstacle is present also when the obstacle absorbs the laser light beams and the reflected light beams cannot be obtained. This is advantageous in improving accuracy in determination of presence or absence of an obstacle.

A conventional obstacle sensing system senses presence of an obstacle by using the reflected light beams from the obstacle. Accordingly, in order improve the accuracy of the obstacle sensing system, it is necessary to increase output of the laser light beams and facilitate obtaining of the reflected light beams or to improve the sensitivity of the reception part 10 and enable sensing of a very low amount of reflection light. A great effort has been made to directly search for an obstacle whose presence is uncertain. Moreover, the higher the sensitivity of the system is, the greater the defect of sensing rain and insects that are not obstacles as obstacles is. Moreover, the conventional obstacle sensing system has such a defect that, when the laser light beams are not emitted or the reflected light beams are not sensed as a result of some kind of failure, the system cannot sense an obstacle even if it is present and determines that the traveling is safe.

The obstacle sensing system 1 of the present invention is configured to sense absence of an obstacle. Specifically, the obstacle sensing system 1 is configured to check at what ratio the obstacle sensing system 1 can sense the virtual straight line, that is the reference line 16 formed on the travel surface 8. Since the obstacle sensing system 1 only needs to sense the reference line 16, there is no need to increase the output of the laser light beams or improve the sensitivity of the reception part 10 to improve the accuracy of the obstacle sensing system 1. The obstacle sensing system 1 is configured to determine a possibility of absence of an obstacle and can determine a condition where an obstacle is highly likely to be absent and a degree of safety is assumed to be high and a condition where an obstacle is likely to be present and a degree of safety is assumed to be low, depending on the fullness percentage.

The obstacle sensing system 1 is configured to determine whether an obstacle is present or absent depending on the reflected light beams reflected inside the sensing region S. Accordingly, when the obstacle sensing system 1 cannot receive the reflected light beams due to problems such as a failure of the transmission part 9 or the reception part 10, the obstacle sensing system 1 does not erroneously determine that an obstacle is absent. Thus, the obstacle sensing system 1 is a system that operates on the safety side. This is advantageous in improving safety in movement of the moving body 2.

Since the conventional obstacle sensing system directly search for an obstacle whose presence is uncertain, the conventional obstacle sensing system determines that an obstacle is present even if there is a small response, and stops the moving body. Meanwhile, in the present invention, for example, when one laser light beam is reflected outside the sensing region S due to rain or an insect, 2399 pieces of data are ON among the 2400 pieces of data sent to the determination mechanism 13 and the fullness percentage is 90% or more. Accordingly, it is possible to avoid such a defect that the moving body 2 such as the gantry crane is brought to emergency stop.

When the obstacle sensing system 1 includes the threshold setting mechanism 14, a crane operator or the like can appropriately adjust the threshold depending on weather or the like. In clear weather, the threshold can be set to, for example, 90%. In heavy rain, the threshold can be set to, for example, 50%. The moving body 2 such as the gantry crane can be allowed to travel even when many laser light beams are reflected outside the sensing region S due to rain. Also in this case, when a worker is present on the reference line 16, the fullness percentage further decreases to a low value such as, for example, 25% and the obstacle sensing system 1 can thus sense the presence of the worker.

The configuration in which the comparison mechanism 11 is installed allows one-bit ON or OFF data to be sent to the determination mechanism 13. Since an amount of data sent to the determination mechanism 13 is extremely small, this is advantageous in saving a memory amount necessary for the determination mechanism 13 to perform the determination. For example, when the moving body 2 is formed of the gantry crane, the determination mechanism 13 can be incorporated in a sequencer (PLC) that controls operations of the gantry crane. Since the sequencer also needs to perform processing of controlling traveling of the gantry crane, loading, unloading, and the like, the smaller the memory amount occupied by the determination mechanism 13 is, the more desirable the configuration is.

Since the memory amount occupied by the determination mechanism 13 can be reduced, it is possible to increase the number of laser light beams emitted by the transmission part per unit time or increase the frequency of the determination by the determination mechanism 13. When the transmission part 9 is formed of a two-dimensional laser scanner with the mirror rotation speed of 50 Hz, the determination mechanism 13 can perform the determination without greatly increasing the occupation amount of the memory in the sequencer.

Assume that the determination mechanism 13 can process, for example, 2400 pieces of data in one second when the obstacle sensing system 1 includes no comparison mechanism 11. The determination mechanism 13 can process, for example, 24,000 pieces of data in on second when the obstacle sensing system 1 includes the comparison mechanism 11.

Moreover, since the installation of the comparison mechanism 11 reduces the amount of data processed by the determination mechanism 13, the time required for the determination mechanism 13 to perform the determination can be reduced. The determination mechanism 13 can perform determination with almost no delay also when the resolution of the two-dimensional laser scanner forming the transmission part 9 is relatively high and the rotation speed is relatively high.

The obstacle sensing system 1 can appropriately determine safety of the moving body 2 without delay also when the moving body 2 is a body that moves at high speed such as, for example, an automobile. This is advantageous in reducing occurrence of defects such as emergency stop of the moving body 2 being too late. The speed of determination by the determination mechanism 13 can be set high relative to the moving speed of the moving body 2. Accordingly, it is unnecessary to take measures such as setting the threshold of the fullness percentage higher than necessary to avoid collision of the moving body 2 with an obstacle or the like.

In the obstacle sensing system 1 of the present invention, the comparison mechanism 11 is not an essential element. When the obstacle sensing system 1 includes no comparison mechanism 11, the configuration may be such that the data obtained in the reception part 10 is sent directly to the determination mechanism 13. In this case, the data on the sensing region S set in advance in the sensing region setting mechanism 12 is sent to the determination mechanism 13. The determination mechanism 13 compares the data obtained from the reception part 10 with the data on the sensing region S and determines whether each reflected light beam is the reflected light beam from the inside of the sensing region S.

The determination mechanism 13 calculates the ratio of the number of reflected light beams from the inside of the sensing region S to the total number of lase light beams emitted from the transmission part 9 as the fullness percentage. The determination mechanism 13 determines that an obstacle is absent and the traveling is safe when the fullness percentage is equal to or more than a predetermined threshold and determines that an obstacle is present when the fullness percentage is smaller than the threshold.

In the obstacle sensing system 1 of the present invention, the configuration in which the determination mechanism 13 calculates the fullness percentage is not an essential element. In this case, the configuration may be such that the determination mechanism 13 determines that an obstacle is absent when the number of reflected light beams from the inside of the sensing region S per unit time is equal to or more than a predetermined threshold such as, for example, 2000 and determines that an obstacle is present when the number of reflected light beams is smaller than this threshold.

The control mechanism 15 in the obstacle sensing system 1 of the present invention is not an essential element. When the moving body 2 is the gantry crane, the configuration may be such that the determination result of the determination mechanism 13 is displayed on a display or the like and notified to the crane operator. Moreover, the configuration may be such that, when the determination mechanism 13 determines that an obstacle is present, a warning sound or the like is given to alert the crane operator.

When the obstacle sensing system 1 includes the control mechanism 15, it is possible to not only inform the crane operator but also to perform control of automatically decelerating or stopping the gantry crane. The configuration may be such that the control mechanism 15 automatically controls deceleration, stopping, and the like of the gantry crane in automatic traveling thereof.

Moreover, the control mechanism 15 may be configured to control a deceleration amount of the moving body 2 depending on the value of the fullness percentage. For example, the control mechanism 15 may control the deceleration amount such that the smaller the fullness percentage is, the greater the deceleration amount is. The higher the fullness percentage is, the higher the degree of safety is and the lower the fullness percentage is, the lower the degree of safety is. Accordingly, the moving speed of the moving body 2 is low when the degree of safety is low. In a poor visibility condition such as heavy rain, although the moving speed of the moving body 2 becomes low, the moving body 2 is allowed to travel.

Figure 6:
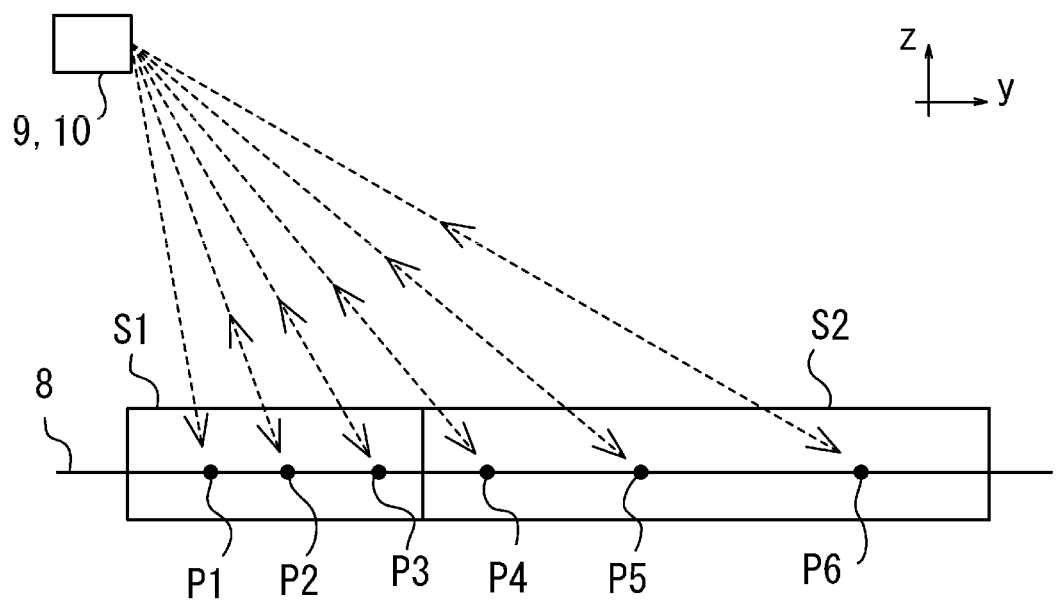
FIG. 6 is an explanatory view illustrating a modified example of a sensing region in FIG. 4.

As illustrated in FIG. 6, the sensing region setting mechanism 12 may be configured to set multiple sensing regions S. In the embodiment of FIG. 6, two sensing regions S are set which are a sensing region S1 set near the moving body 2 along the moving direction y of the moving body 2 and a sensing region S2 set far from the moving body 2. In this embodiment, both of the sensing regions S1, S2 are formed in rectangular shapes parallel to the moving direction y and the up-down direction z. Moreover, the sensing regions S1, S2 are set at such positions that the regions S1, S2 do not overlap each other.

The control mechanism 15 may be configured to perform different controls respectively for the two sensing regions S1, S2. It is possible to set the threshold of the fullness percentage in each region to, for example, 90% and cause the control mechanism 15 to perform control of decelerating the moving body 2 when the fullness percentage falls below the threshold in the sensing region S2 on the far side and perform control of stopping the moving body 2 when the fullness percentage falls below the threshold in the sensing region S1 on the near side.

Different thresholds can be set respectively for the two sensing regions S1, S2. For example, it is possible to set the threshold in the sensing region S1 on the near side to 90% and set the threshold in the sensing region S2 on the far side to 70%. The control mechanism 15 can be configured to perform control of decelerating the moving body 2 when the fullness percentage falls below the threshold in the sensing region S2 on the far side and perform control of decelerating the moving body 2 when the fullness percentage falls below the threshold in the sensing region S1 on the near side. Since the threshold in the sensing region S1 on the near side is set higher than the threshold in the sensing region S2 on the far side, the closer the moving body 2 is to an obstacle, the more likely the moving body 2 is decelerated.

The different control contents and different thresholds can be set respectively for the two sensing regions S1, S2. For example, the control mechanism 15 can perform control of decelerating the moving body 2 when the fullness percentage falls below 70% in the sensing region S2 on the far side and perform control of brining the moving body 2 to emergency stop when the fullness percentage falls below 90% in the sensing region S1 on the near side.

The control mechanism 15 can be configured to control an upper limit value of the moving speed of the moving body 2 depending on the value of the fullness percentage in the sensing region S2 on the far side. For example, the upper limit value of the moving speed can be proportional to the value of the fullness percentage. In this case, the smaller the fullness percentage is, the smaller the upper limit value of the moving speed of the moving body 2 is. Accordingly, it is possible to decelerate the moving body 2 as the moving body 2 comes closer to an obstacle.

The number of sensing regions S is not limited to that described above. Three or more regions set at positions where the regions do not overlap one another may be set as the sensing region S. Multiple regions set at positions where the regions partially overlap one another may be set as the sensing region S.

Moreover, the threshold of the fullness percentage and the control performed when the threshold falls below the threshold can be set for each of the multiple sensing regions S. Alternatively, the setting may be such that no threshold is set and control of changing each of the moving speed and the deceleration amount of the moving body 2 proportional to or inverse proportional to the fullness percentage is performed.

Figure 7:
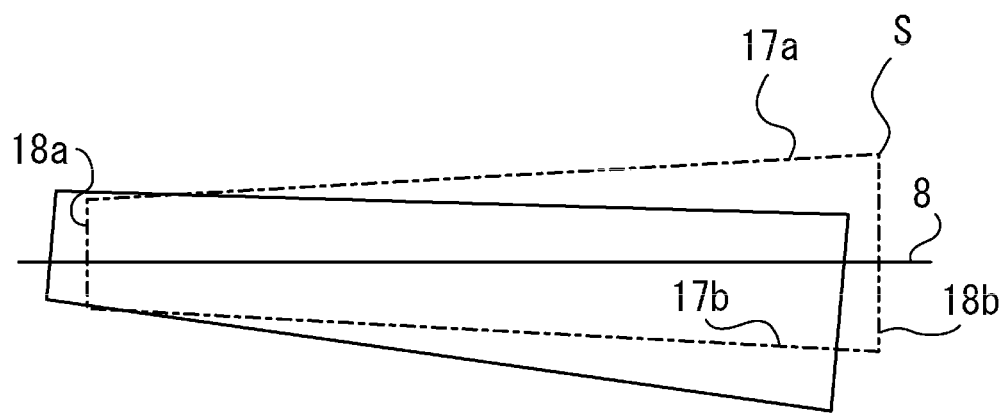
FIG. 7 is an explanatory view illustrating a modified example of the sensing region in FIG. 4.

As illustrated in FIG. 7, the sensing region setting mechanism 12 may be configured to set a trapezoidal sensing region S. In this embodiment, the length of the short side 18b located far from the moving body 2 and extending in the up-down direction z is set greater than the length of the short side 18a located near the moving body 2 and extending in the up-down direction z.

In the case where the gantry crane includes rubber tires or in similar cases, the moving body 2 sometimes rises or sinks in the moving direction y due to reasons such as the center of gravity of a loaded container not being located at the center. The moving body 2 rises or sinks means, a front portion of the moving body 2 is higher or lower than the rear portion. When the moving body 2 rises or sinks, the tilt and position of the transmission part 9 with respect to the travel surface 8 changes. Since the position of the sensing region S relative to the transmission part 9 is fixed, the position of the sensing region S changes with the tilting of the transmission part 9 and the like.

Setting the trapezoidal sensing region S allows the obstacle sensing system 1 to maintain a state where the reference line 16 formed on the travel surface 8 is inside the sensing region S even if the moving body 2 rises or sinks. When the reference line 16 is located outside the sensing region S, the obstacle sensing system 1 determines that an obstacle is present even though an obstacle is absent. The accuracy in the determination of presence or absence of an obstacle can be improved also when the moving body 2 rises or sinks. In FIG. 7, the range of the sensing region S and the position of the transmission part 9 and the like in the case where no rising or sinking of the moving body 2 is occurring are illustrated by one-dot chain lines for description.

Note that, when the travel surface 8 is tilted as whole, the moving body 2 is tilted together with the travel surface 8. Accordingly, even if the sensing region S has a rectangular shape, the reference line 16 is located inside the sensing region S. When the moving body 2 is an automobile or the like that is less likely to rise and sink, the presence or absence of an obstacle can be accurately determined even if the sensing region S is set to have a rectangular shape.

When unevenness of the travel surface 8 in the up-down direction z is relatively large, forming the sensing region S to have a trapezoidal shape makes it easier to maintain a state where the reference line 16 is inside the sensing region S even if the moving body 2 vibrates by moving. Moreover, setting the short sides 18a, 18b to have relatively large lengths makes it easier to maintain a state where the reference line 16 is inside the sensing region S even if the sensing region S is set to have a rectangular shape.

Meanwhile, when the travel surface 8 has almost no unevenness, the short sides 18a, 18b of the sensing region S can be set to have relatively small lengths. Setting the lengths of the short sides 18a, 18b in a range of, for example, plus and minus 30 mm from the reference line 16 in the up-down direction z allows the obstacle sensing system 1 to sense an obstacle whose length in the up-down direction z is greater than 30 mm. This is advantageous in the case where a relatively small obstacle needs to be sensed.

Although the sensing region S is set to have an isosceles trapezoid shape in which the paired long sides 17a, 17b have the same length in the embodiment, the sensing region S is not limited to this. For example, when the front portion of the moving body 2 sinks in some cases but never rises, the sensing region S can be set to a trapezoidal shape in which the upper long side 17a is longer than the lower long side 17b.

As in the embodiment illustrated in FIG. 6, the configuration may be such that the trapezoidal sensing region S is set to be divided into multiple regions.

Figure 8:
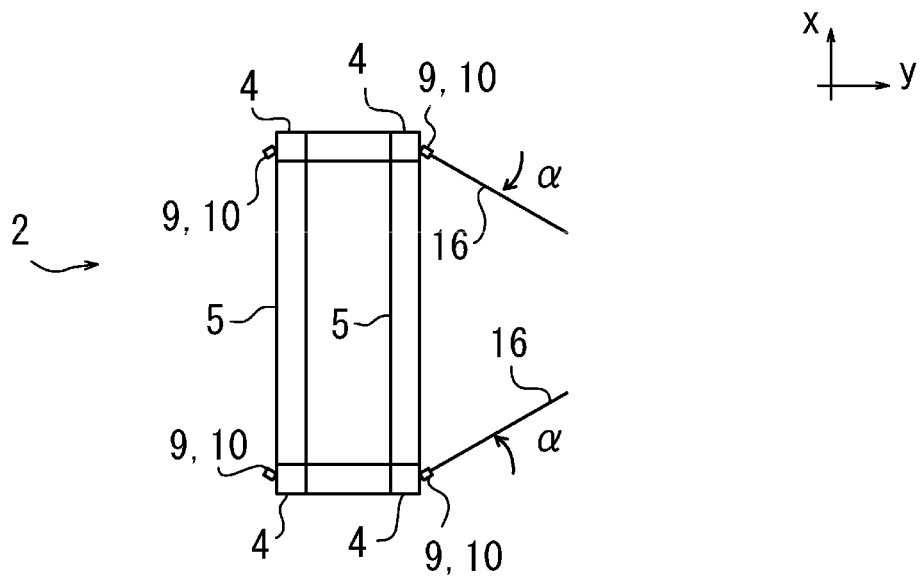
FIG. 8 is an explanatory view illustrating a modified example of scanning directions of laser light beams.

As illustrated in FIG. 8, the direction of scanning with the laser light beams by each transmission part 9 can be set to a direction extending along the moving direction y while being tilted toward the transverse direction x. In this case, the reference line 16 is tilted at a predetermined angle α toward the transverse direction x with respect to the moving direction y. In the embodiment, the reference lines 16 are tilted to extend from the left and right leg members 4 of the gantry crane toward the inner side.

In this configuration, the obstacle sensing system 1 can sense a worker or the like when the worker is to be inside the paired traveling devices 3 located on the opposite sides in the transverse direction x. Specifically, the obstacle sensing system 1 can sense an obstacle in directions other than the direction parallel to the moving direction y with the sensing range increased in the transverse direction x.

When the gantry crane that is the moving body 2 travels in the reverse direction, the transmission parts 9 and the like on the front side in the moving direction y emit laser light beams and the reference lines 16 are formed in front of the moving body 2 in the traveling direction thereof.

Figure 9:
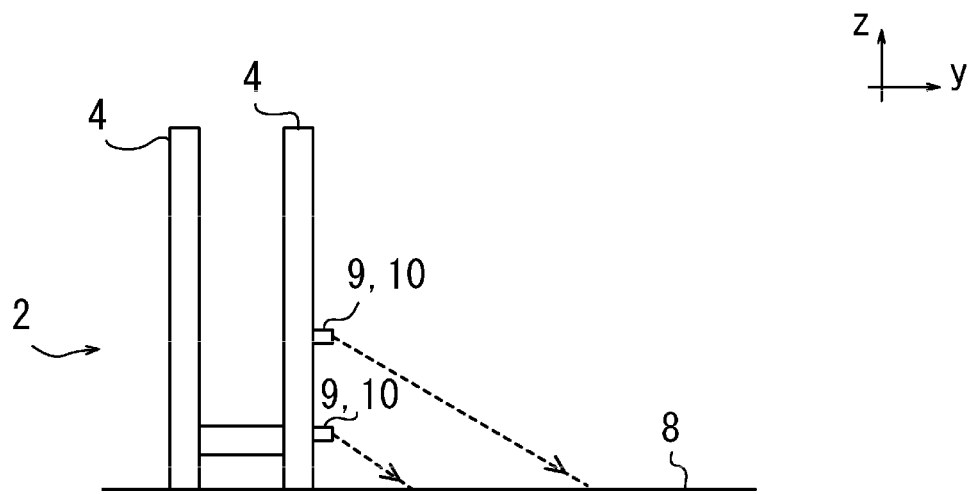
FIG. 9 is an explanatory side view illustrating a modified example of the obstacle sensing system in FIG. 1.

As illustrated in FIG. 9, the configuration may be such that one leg member 4 includes multiple transmission parts and multiple reception parts 10. Employing the configuration in which multiple transmission parts 9 and multiple reception parts 10 are installed on one leg member 4 can appropriately increase the range in which an obstacle can be sensed.

In this case, for example, the configuration may be such that one set of the transmission part 9 and the like senses safety in the direction parallel to the moving direction y and the other set of the transmission part 9 and the like senses safety in the direction tilted toward the transverse direction x as illustrated in FIG. 8. In the embodiment of FIG. 9, two sets of the transmission part 9 and the like are installed on the leg member 4 at an interval in the up-down direction z.

Figure 10:
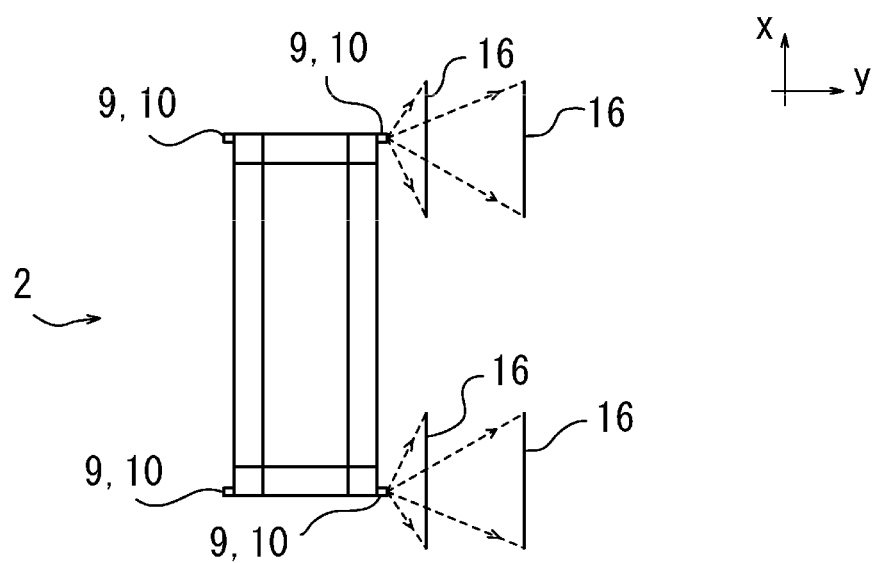
FIG. 10 is an explanatory view illustrating a modified example of the scanning directions of laser light beams.

As illustrated in FIG. 10, the reference line 16 can be set parallel to the transverse direction x. It is possible to install two sets of the transmission part 9 and the like on one leg member 4 and set multiple reference lines 16 at different positions in the moving direction y. In this case, each sensing region S is a quadrilateral region formed on a plane extending in the transverse direction x and the up-down direction z. This is advantageous in increasing the range in which an obstacle can be sensed in the transverse direction x.

The moving body 2 travels while checking multiple reference lines 16. In this embodiment, the moving body 2 travels while checking four reference lines 16. When a portion of any of the reference lines 16 is, for example, missing and cannot be recognized, the obstacle sensing system 1 determines that the degree of safety of an area in front of the moving body 2 is low and can perform control of, for example, decelerating the moving body 2.

Figure 11:
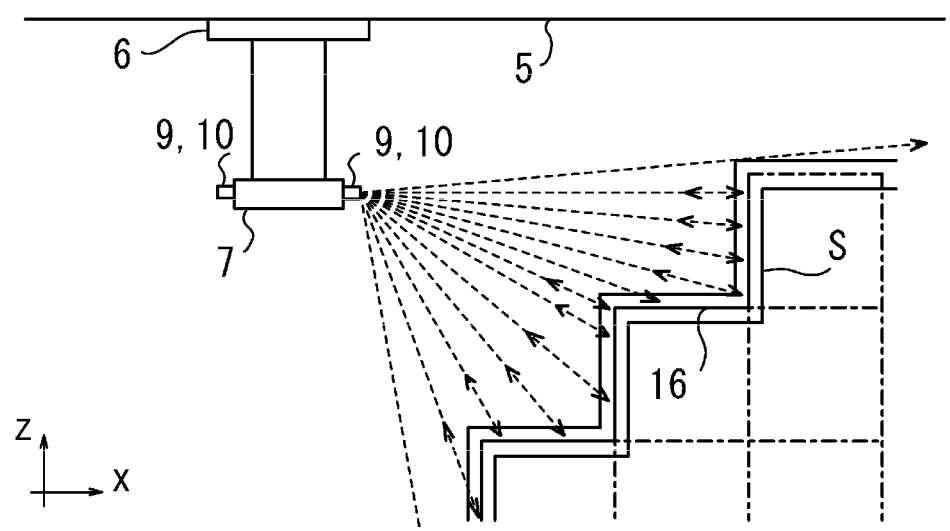
FIG. 11 is an explanatory side view illustrating a hoisting tool in which the obstacle sensing system is installed.

As illustrated in FIG. 11, the configuration may be such that the obstacle sensing system 1 is applied to the hoisting tool 7 of a gantry crane or a quay crane. In this case, the transmission part 9 and the like are installed in the hoisting tool 7. A container yard in which the gantry crane or the like loads and unloads containers is provided with a higher-level system that accurately grasps the positions and heights of the stored containers.

The obstacle sensing system 1 can grasp a status of stacked-up containers based on information of the higher-level system, and the sensing region setting mechanism 12 can thus set the sensing region S along side surfaces and top surfaces of the stacked-up containers. The reference line 16 formed of the side surfaces and top surfaces of the containers is formed inside the sensing region S. In this embodiment, the scanning with the laser light beams can be performed with the tilt θn of the traveling direction of the laser light beams with respect to the up-down direction z set within a range of 0 degrees or more and 120 degrees or less.

When a container that should not be placed on the reference line 16 is placed on the reference line 16, the value of the fullness percentage is small. In this case, the control mechanism 15 or the like can stop the hoisting tool 7 or reduce the moving speed of the hoisting tool 7. Moreover, the value of the fullness percentage is small when the worker is present on the reference line 16. Accordingly, the stopping of the hoisting tool 7 or the like can be performed.

The obstacle sensing system 1 may be configured to be applied to the trolley 6 as described above. In this case, the transmission part 9 and the like are installed on a lower surface of the trolley 6.

The directions in which the reference lines 16 are formed, the shapes and numbers of the sensing regions S, and the like in the aforementioned embodiments can be used in an appropriate combination.

The obstacle sensing system 1 is not limited to use in the gantry crane, the quay crane, and the like and can be used when the reference line 16 that is a collection of the reflection positions Pn from which the reflected light beams are obtained when an obstacle is absent has a known shape. For example, the obstacle sensing system 1 can be installed in a chassis or an automobile that travels along the travel surface 8. Moreover, the obstacle sensing system 1 can be installed in the hoisting tool 7 in which the obstacle sensing system 1 can know the shape of the reference line 16 from the higher-level system. Employing the obstacle sensing system 1 can improve safety in automatic driving of the moving body 2.

EXPLANATION OF REFERENCE NUMERALS

1 obstacle sensing system
2 moving body
3 traveling device
4 leg member
5 beam member
6 trolley
7 hoisting tool
8 travel surface
9 transmission part
10 reception part
11 comparison mechanism
12 sensing region setting mechanism
13 determination mechanism
14 threshold setting mechanism
15 control mechanism
16 reference line
17a long side (upper side)
17b long side (lower side)
18a short side (near side)
18b short side (far side)
θn angle (of laser light beam)
Pn reflection position
S sensing region
S1 sensing region (near side)
S2 sensing region (far side)
α angle (of reference line)
x transverse direction
y moving direction
z up-down direction

The invention claimed is:

1. An obstacle sensing system including a transmission part that is installed in a moving body and that emits laser light beams while changing an emission angle and a reception part that receives reflected light beams of the laser light beams, characterized in that the obstacle sensing system comprises:
   a sensing region setting mechanism that sets multiple sensing regions in advance in a region around reflection positions where the laser light beams are reflected when an obstacle is absent; and
   a determination mechanism that, for each of the sensing regions, calculates a fullness percentage which is a ratio of the number of the reflected light beams reflected inside the sensing region to a total number of laser light beams emitted from the transmission part, determines that an obstacle is absent when the fullness percentage is equal to or more than a predetermined threshold, and determines that an obstacle is present when the fullness percentage is smaller than the threshold,
   wherein a threshold which is different for each of the sensing regions is set.

2. The obstacle sensing system according to claim 1, characterized in that
   the obstacle sensing system comprises a comparison mechanism that sends ON signals to the determination mechanism when the reflection positions where the laser light beams are reflected are inside the sensing region and sends OFF signals to the determination mechanism when the reflection positions where the laser light beams are reflected are outside the sensing region, and
   the determination mechanism has a configuration that calculates a fullness percentage which is a ratio of the number of the ON signals to a total number of the ON signals and the OFF signals obtained from the comparison mechanism, determines that an obstacle is absent when the fullness percentage is equal to or more than a predetermined threshold, and determines that an obstacle is present when the fullness percentage is smaller than the threshold.

3. The obstacle sensing system according to claim 1, characterized in that
the obstacle sensing system comprises a control mechanism controlling the moving body based on a determination result in the determination mechanism, and
the control mechanism has a configuration that sets different control contents for each of the sensing regions.

4. The obstacle sensing system according to claim 1, characterized in that
the obstacle sensing system comprises a threshold setting mechanism adjusting the threshold.

5. The obstacle sensing system according to claim 1, characterized in that
the obstacle sensing system comprises a control mechanism controlling the moving body based on a determination result in the determination mechanism, and
the control mechanism has a configuration of decelerating the transport body based on a determination result in the determination mechanism and controlling the deceleration amount of the moving body depending on the value of the fullness percentage.

6. The obstacle sensing system according to claim 1, characterized in that
the obstacle sensing system comprises a control mechanism controlling the moving body based on a determination result in the determination mechanism, and
the control mechanism has a configuration of controlling an upper limit value of the moving speed of the moving body depending on the value of the fullness percentage.

7. An obstacle sensing method including emitting laser light beams from a transmission part installed in a moving body while changing an emission angle and receiving reflected light beams of the laser light beams with a reception part to sense presence or absence of an obstacle, characterized in that the obstacle sensing method comprises:
setting multiple sensing regions in advance in a region around reflection positions where the laser light beams are reflected when an obstacle is absent; and
for each of the sensing regions, calculating a fullness percentage which is a ratio of the number of the reflected light beams reflected inside the sensing region to a total number of laser light beams emitted from the transmission part, determining that an obstacle is absent when the fullness percentage is equal to or more than a predetermined threshold, and determining that an obstacle is present when the fullness percentage is smaller than the threshold,
wherein a threshold which is different for each of the sensing regions is set.

8. The obstacle sensing method according to claim 7, characterized in that
the obstacle sensing method comprises arranging a comparison mechanism between the reception part and the determination mechanism and sending ON signals from the comparison mechanism to the determination mechanism when the reflection positions where the laser light beams are reflected are inside the sensing region and sending OFF signals from the comparison mechanism to the determination mechanism when the reflection positions where the laser light beams are reflected are outside the sensing region, and
the determination mechanism calculates a fullness percentage which is a ratio of the number of the ON signals to a total number of the ON signals and the OFF signals obtained from the comparison mechanism, determines that an obstacle is absent when the fullness percentage is equal to or more than a predetermined threshold, and determines that an obstacle is present when the fullness percentage is smaller than the threshold.

9. The obstacle sensing method according to claim 7, characterized in that the obstacle sensing method comprises in advance:
a control mechanism controlling the moving body based on the determination of presence or absence of an obstacle, and
the control mechanism performs a different control for each of the sensing regions.

10. The obstacle sensing method according to claim 7, characterized in that the obstacle sensing method comprises in advance:
a threshold setting mechanism that adjusts the threshold, and
the threshold is adjusted by the threshold setting mechanism.

11. The obstacle sensing method according to claim 7, characterized in that the obstacle sensing method comprises in advance:
a control mechanism controlling the moving body based on the determination of presence or absence of an obstacle, and
the control mechanism decelerates the moving body based on the determination of presence or absence of an obstacle and controls the deceleration amount of the moving body based on the value of the fullness percentage.

12. The obstacle sensing method according to claim 7, characterized in that the obstacle sensing method comprises in advance:
a control mechanism controlling the moving body based on the determination of presence or absence of an obstacle, and
controlling an upper limit value of the moving speed of the moving body depending on the value of the fullness percentage.

* * * * *